United States Patent [19]

Maeda et al.

[11] Patent Number: 4,911,009
[45] Date of Patent: Mar. 27, 1990

[54] THERMAL AIR FLOW METER

[75] Inventors: Haruhiko Maeda, Katsuta; Tadao Suzuki, Hitachi, both of Japan

[73] Assignee: Hitachi, Ltd., Tokyo, Japan

[21] Appl. No.: 253,576

[22] Filed: Oct. 5, 1988

[30] Foreign Application Priority Data

Oct. 9, 1987 [JP] Japan ................. 62-253704

[51] Int. Cl.$^4$ ................. G01F 01/68; G01K 13/06
[52] U.S. Cl. ................. 73/204.25; 73/204.11; 361/424; 374/135; 374/175
[58] Field of Search ........ 374/135, 144, 35, 175; 73/204.22, 204.25, 204.26, 204.27, 861.71, 204.11; 174/35 R; 361/424; 244/134

[56] References Cited

U.S. PATENT DOCUMENTS

| 3,798,967 | 3/1974 | Gieles | 73/204.22 |
| 4,386,388 | 5/1983 | Beun | 174/35 R X |
| 4,624,582 | 11/1986 | Banda et al. | 174/35 R X |
| 4,658,334 | 4/1987 | McSparran et al. | 174/35 R X |
| 4,733,975 | 3/1988 | Komanetsky | 374/144 |

FOREIGN PATENT DOCUMENTS 586414 7/1981 Japan ................. 73/204.22

Primary Examiner—Daniel M. Yasich
Attorney, Agent, or Firm—Antonelli, Terry & Wands

[57] ABSTRACT

A thermal air flow meter for measuring the flow rate of intake air supplied to an internal combustion engine comprises a thermal sensor disposed in an intake air passage, a drive circuit including a circuit pattern formed on a circuit board for driving the thermal sensor, a shielding case having at least a bottom wall on which the circuit board is mounted and side walls, a through capacitor disposed on one of the side walls of the shielding case, a conductor extending through the capacitor so that the conductor is electrically connected in an AC mode through the capacitor to the shielding case and having one end connected to a corresponding terminal of the drive circuit and the other end connected to an external terminal, a metal case in which the shielding case is mounted and a connecting member electrically connecting the shielding case to the metal case at an area on the bottom wall selected between an edge of the bottom wall connected to the one side wall and an edge of the pattern formed on the circuit board closest to the one side wall, whereby the endurance electromagnetic compatability of the air flow meter is improved.

10 Claims, 5 Drawing Sheets

THERMAL AIR FLOW METER

BACKGROUND OF THE INVENTION

1. Field of the Invention

This invention relates to a hot wire type air flow meter, and more particularly to an air flow meter which is suitable for measuring the flow rate of air supplied to an internal combustion engine and which operates with an excellent endurance electromagnetic compatibility.

2. Description of the Related Art

A hot wire type flow meter is disclosed in, for example, Japanese patent unexamined publication JP-A-No. 58-6414. In the prior art hot wire type flow meter, through-capacitors are fixed to conductor leading openings respectively of a sheilding case of an electrical conductive material accommodating a drive circuit which drives a flow rate sensor, and power supply and signal output conductors, to be connected to the drive circuit are extended into the shielding case through the respective through-capacitors thereby preventing the drive circuit from being disturbed by outside noises.

In the prior art flow meter described above, the power supply and signal output conductors connected to the drive circuit driving the flow rate sensor are electrically connected in an AC mode through the capacitors to the shielding case. However, no consideration is given in the prior art flow meter as to electrically connecting the conductive shielding case to a flow meter case in which the shielding case is mounted and the shielding case is merely fixed to the flow meter case by an adhesive. Therefore, the shielding case could not always be fixed to the flow meter case in a relation accurately positioned relative to the latter, and, because the former was not electrically connected to the latter, the endurance electromagnetic compatibility of the flow meter has been quite low.

SUMMARY OF THE INVENTION

It is an object of the present invention to provide a thermal air flow meter in which through capacitors, through which conductors connecting a drive circuit to a positive terminal and a negative terminal of a power supply and an output signal line extend, are electrically connected to a flow meter case at a portion thereof made of an electrically conductive material and disposed in a selected area thereby to improve the endurance electromagnetic compatibility of the air flow meter.

According to the present invention which attains the above object, the conductors and the output signal line described above extend through the through-capacitors which are electrically connected in an AC mode through the through-capacitors to a shielding case of an electrically conductive material accommodating the drive circuit, and the shielding case is brought into electrical contact with the flow meter case at a portion thereof made of an electrically conductive material and disposed in a specific area which is determined as follows. That is, a circuit board formed with a circuit pattern for the drive circuit is attached to a bottom wall of the shield case and the through-capacitors are fixed to one of the side walls of the shield case connected to the bottom wall. The specific area is selected within an area on a bottom wall or base of the flow meter case corresponding to the area on the bottom wall of the shielding case between an edge of the circuit board closest to the one side wall on which the through-capacitators are fixed and an edge of the bottom wall connected to the one side wall.

In an embodiment of the thermal air flow meter according to the present invention, signal terminals connected to an external wiring harness to receive power supplied to a drive circuit and to transmit an output signal from the drive circuit are connected to the drive circuit by electrical conductive members or wires extending through associated through-capacitors fixed to a shielding case of an electrical conductive material. The through capacitors are electrically connected in an AC mode through the capacitors to the shielding case, to a bottom wall of which a circuit board having a circuit pattern constituting the drive circuit is fixed. The shielding case is brought into electrical contact with an electrically conductive portion of a flow meter case at a selected area as mentioned above. With this arrangement, electrical noise generated from the external wiring harness under influence of radio wave can be earthed through the through-capacitors to the electrically conductive portion of the flow meter case or to an air intake body defining an intake air passage, before the electrical noise is transmitted to the drive circuit of the hot wire type air flow meter. Therefore, the drive circuit can be shielded against the adverse effect of the radio wave, and the endurance electromagnetic compatibility of the air flow meter can be improved.

DESCRIPTION OF THE PREFERRED EMBODIMENTS

Preferred embodiments of the present invention will now be described with reference to the drawings.

Figure 1:
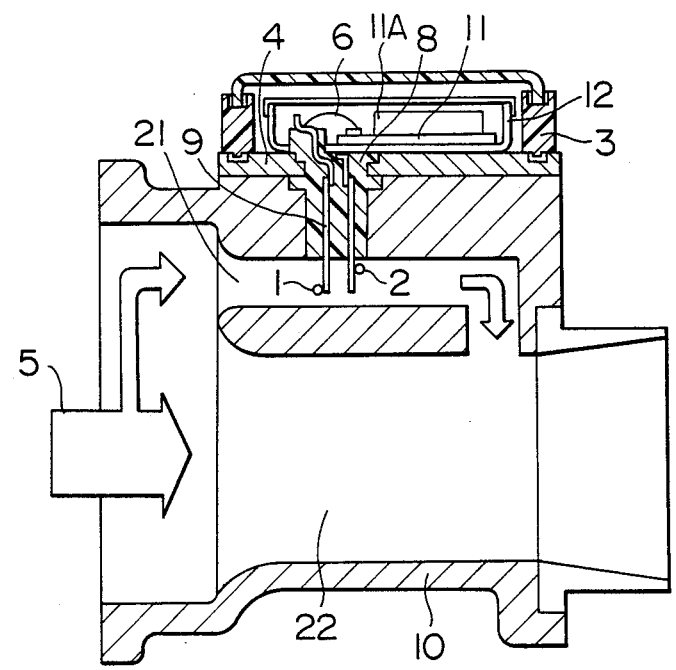
FIG. 1 is a schematic sectional view of an embodiment of the hot wire type air flow meter of the present invention when its sensor is disposed in a bypass air passage.

FIG. 1 is a schematic sectional view of an embodiment of the hot wire type air flow meter of the present invention designed for measuring the flow rate of intake air of an internal combustion engine.

Referring to FIG. 1, the air flow meter includes a hot wire 1 made by winding a filament of platinum around a bobbin of alumina and coating thereon a surface covering of a glass material. This hot wire 1 is welded to exposed portions of a pair of supporting pins 9 inserted into a supporting member 8 of an electrical insulator supporting a base 4 of a flow meter case, which base is made of an electrically conductive material. A cold wire 2 operating as an electrical resistor similar to the hot wire 1 is provided for the purpose of compensation of the temperature of intake air and is similarly welded to exposed portions of supporting pins 9 inserted into the supporting member 8. The supporting pins 9 are electrically connected to a drive circuit schematically shown at 11A formed on a circuit board 11 through a wiring connection 6 of aluminum. The circuit board 11 is fixed by an adhesive to a shielding case 12 made of an electrically conductive material, and the shieldingn case 12 is also fixed by an adhesive to the base 4 of the flow meter case. The top and side walls of the flow meter case 3 are made of a molded resin material and are mounted on the base 4 which carries the shielding case 12 and associated parts.

The hot wire type air flow meter, including the drive circuit on the circuit board 11 and the hot and cold wires 1 and 2 welded to the supporting pins 9, is mounted on an air intake body 10 in which a bypass air passage 21 and a main air passage 22 are formed. When the air flow meter is mounted on the air intake body 10, the hot and cold wires 1 and 2 are located in the bypass air passage 21. The drive circuit 11A supplies current to the hot wire 1 to heat the hot wire 1 so that the difference between the temperature of the hot wire 1 and that of intake air flow 5 is maintained constant regardless of the quantity of intake air flow 5, while the temperature variation of intake air flow 5 is detected and compensated by using a cold wire 2. Therefore, when the flow rate of air flowing through the bypass air passage 21 is high, a large current is supplied to the hot wire 1, while when the flow rate of air is low, a small current is supplied to the hot wire 1, so that the temperature difference can be maintained constant. The relation between the value of current supplied to the hot wire 1 and the flow rate of intake air flow 5 is expressed by a monotone increasing function. Thus, by detecting the value of current supplied to the hot wire 1, the flow rate of intake air flow 5 can be detected.

Figure 2:
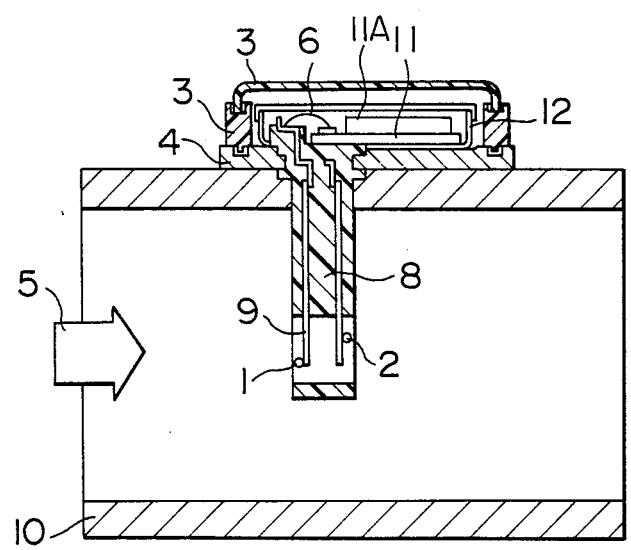
FIG. 2 is a view similar to FIG. 1 to show its sensor disposed in a main air passage.

FIG. 2 shows an arrangement in which the hot wire type air flow meter described with reference to FIG. 1 is mounted on the air intake body 10 having a single air passage.

Figure 3:
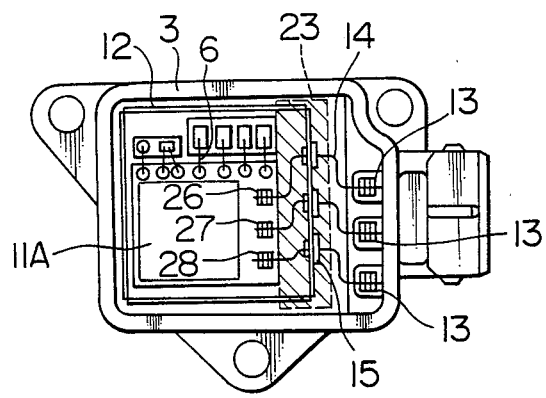
FIGS. 3 and 4 are a schematic plan view and a schematic sectional view respectively of the parts including the drive circuit of the hot wire type air flow meter shown in FIG. 1.
Figure 4:
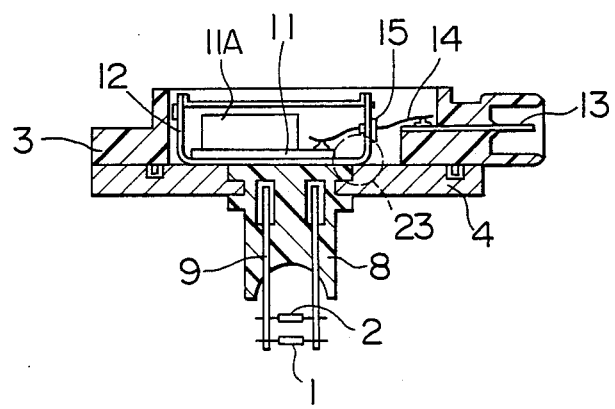

FIGS. 3 and 4 are a schematic plan view and a schematic sectional view respectively of the hot wire type air flow meter described with reference to FIG. 1. Referring to FIGS. 3 and 4, signal terminals 13, 13' and 13" connectable with an external wiring harness, (not shown) are connected to the power line 26, grounding line 27 and signal line 28 of the drive circuit 11 by wires 14 of an electrically conductive material, respectively, and the wires 14 extend through respective through-capacitors 15, which are electrically connected to the shielding case 12. Further, the shielding case 12 is electrically connected to the base 4 at a specific area 23 which is determined as follows. That is, a circuit board 11 formed with a circuit pattern (not shown) of the drive circuit 11A is attached to a bottom wall of the shielding case and the through-capacitors 15 are fixed to one of the side walls of the shielding case 12 connected to the bottom wall. The specific area 23 is selected within an area on the bottom wall or the base 4 of the flow meter case corresponding to the area on the bottom wall of the shielding case 12 between an edge of the circuit board 11 closest to the one side wall having the through-capacitors therein and an edge of the bottom wall of the shielding case connected to the one side wall.

Figure 10:
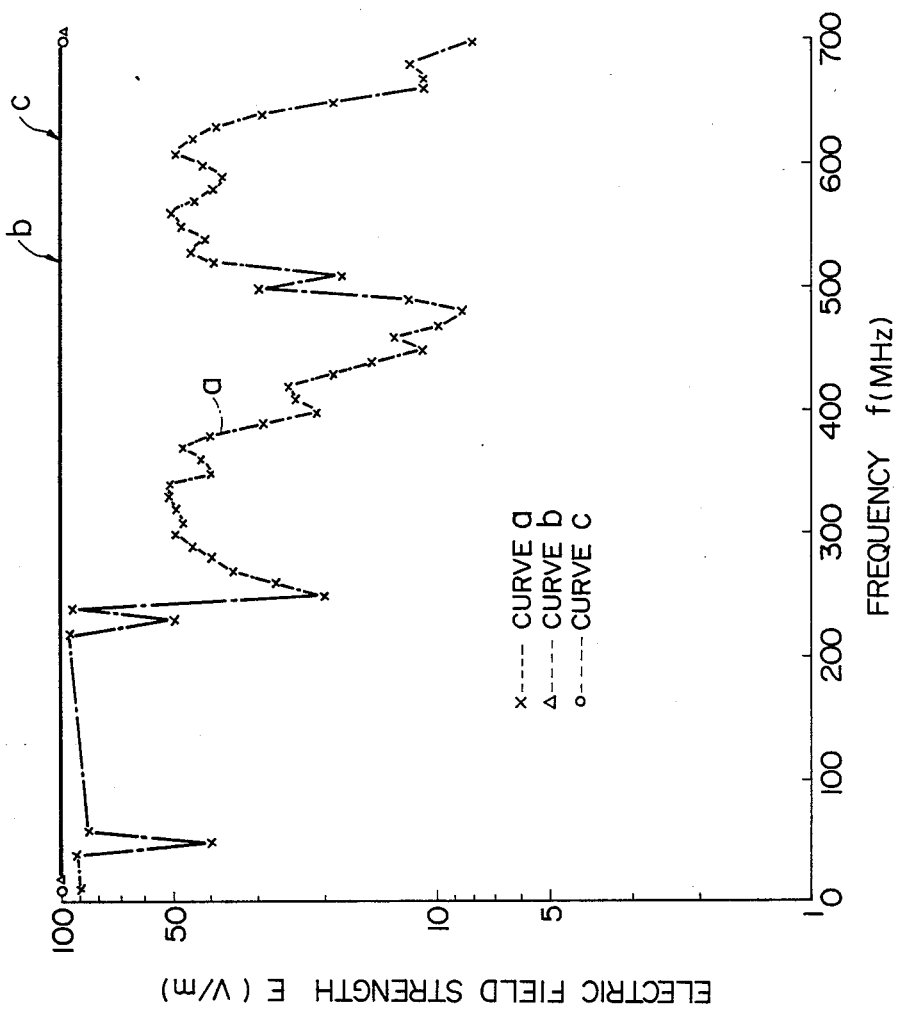
FIG. 10 is a graph showing the results of the endurance electromagnetic compatibility test of the air flow rate sensor.
Figure 11:
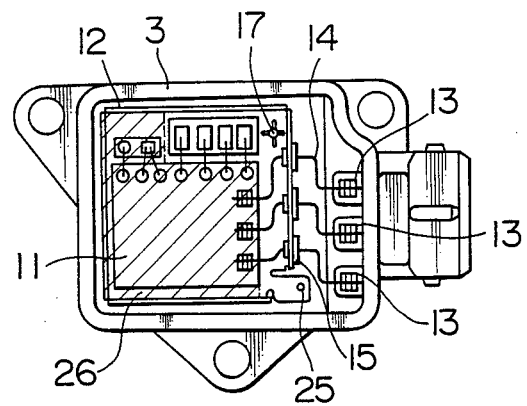
FIGS. 11 and 12 are a schematic plan view and a schematic sectional view respectively of a trial-manufactured model of the air flow meter of the present invention.
Figure 12:
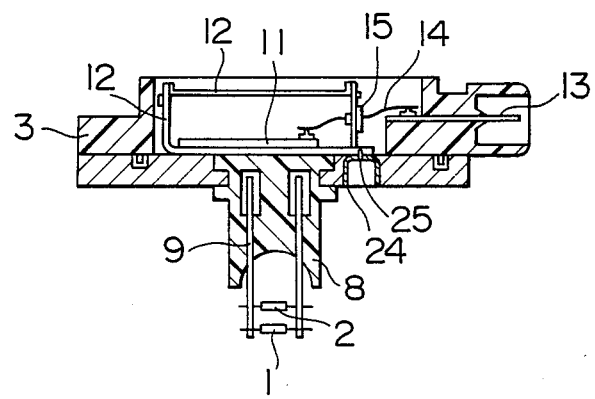

FIG. 10 is a graph showing the results of the endurance electromagnetic compatibility test of a trial-manufactured model of the hot wire type air flow meter of the present invention. FIGS. 11 and 12 are a schematic plan view and a schematic sectional view respectively of the trial-manufactured model of the air flow meter. The characteristic curve a shown in FIG. 10 represents the results of the endurance electromagnetic compatibility test when the shielding case 12 and the base 4 are entirely electrically isolated from each other. The characteristic curve b shown in FIG. 10 represents the endurance electromagnetic compatibility when a cup 24 press-fitted into the base 4 is welded to the shielding case 12 at a point 25, and the shielding case 12 is partly press-fitted on a pin 17 erected on the base 4 so as to provide two spaced electrical connection points at the outside of the array of the through-capacitors 15 mounted on the shielding case 12, while the shielding case 12 is locally electrically isolated from the base 4 in an area 26 lying immediately beneath the circuit board 11, as shown in FIGS. 11 and 12. Further, the characteristic curve c shown in FIG. 10 represents the endurance electromagnetic compatibility when the shielding case 12 and the base 4 are entirely electrically brought into contact with each other. It will be seen from FIG. 10 that the present invention can provide the endurance electromagnetic compatibility of the level equivalent to the case where the shielding case 12 and the base 4 are extirely electrically brought into contact with each other.

Figure 5:
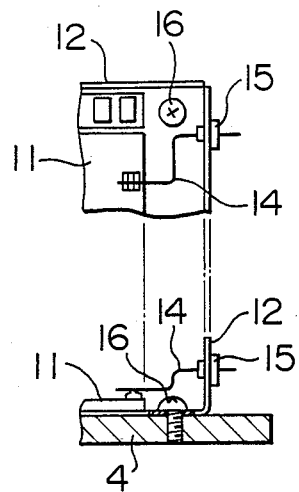
FIGS. 5 to 9 are schematic sectional views showing various manners of grounding the shielding case to the base of the flow meter case.
Figure 6:
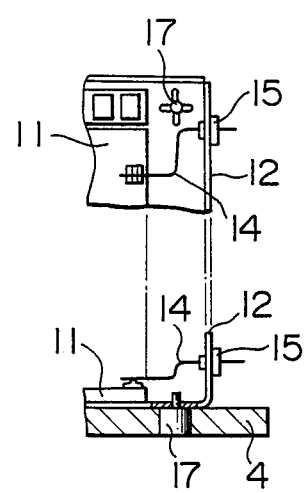
Figure 7:
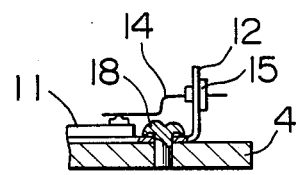
Figure 8:
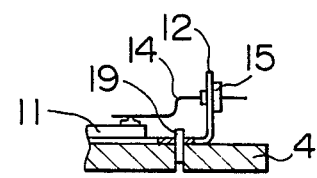
Figure 9:
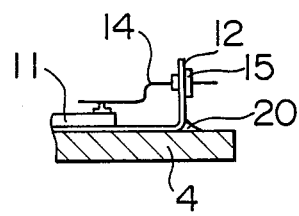

FIGS. 5 to 9 show various manners of grounding the shielding case 12 to the base 4. FIG. 5 shows that the shielding case 12 and the base 4 are electrically connected to each other by a screw 16 of an electrically conductive material. FIG. 6 shows that the pin 17 of an electrically conductive material is press-fitted into the base 4, and the shielding case 12 is previously formed with a mating hole to be press-fitted on the pin 17. FIG. 7 shows that, after a pin 18 of an electrically conductive material is press-fitted into the base 4, the shielding case 12 is electrically connected to the base 4 by caulking the head of the pin 18. FIG. 8 shows that a projection 19 is formed as part of the base 4 by means of, for example, a press, and the shielding case 12 is press-fitted to this projection 19. FIG. 9 shows that the shielding case 12 and the base 4 are electrically connected to each other by an electrically conductive adhesive 20.

In the hot wire type air flow meter described above, the present invention specifies the range where the shielding case 12 enclosing the drive circuit formed on the circuit board 11 is electrically connected to the base 4 of the flow meter case. More precisely, the signal terminals 13, 13' and 13" connected to the external wiring harness are connected to the drive circuit 11A by the wires 14 extending through the through-capacitors 15 which are electrically connected to the shielding case 12 accommodating the drive circuit 11A. Further, the shielding case 12 is brought into electrical contact with the base 4 of the flow meter case in a portion of the area 23 which lies nearly immediately beneath the through-capacitors 15 and which is outside of the conductors printed on the circuit board on which the drive circuit 11A is formed. Therefore, the air flow meter can be shielded from external electrical noise, and the endurance electromagnetic compatibility can be greatly improved without regard to the factors including the thickness of the adhesive layer fixing the shielding case 12 to the base 4 of the flow meter case.

Further, when the manner of joining the shielding case 12 to the base 4 as shown in any one of FIGS. 5 to 8 is applied to a plurality of spaced points, the shielding case 12 can be easily accurately positioned relative to the base 4, and the manufacturing accuracy can be greatly improved.

It will be understood from the foregoing description that the present invention provides a hot wire type air flow meter in which a shielding case accommodating a drive circuit is electrically connected to a base of a flow meter case in a portion of an area which lies nearly immediately beneath through-capacitors mounted on the shielding case and which is outside of conductors printed on a circuit board on which the drive circuit is formed. Therefore, the endurance electromagnetic compatibility of the air flow meter can be greatly improved without regard to the thickness of an adhesive layer used for fixing the shielding case to the base.

We claim:

1. A thermal air flow meter comprising:
   (a) drive circuit means for driving a thermal sensor to be disposed in an intake air passage through which air to be measured flows and including a circuit board and a drive circuit mounted on said circuit board;
   (b) an electrically conductive shielding case in which said drive circuit means is disposed and having a bottom wall on which said circuit board is fixed and side walls connected to respective edges of said bottom wall;
   (c) capacitor means including at least one through-capacitor fixed to one of said side walls of said shielding case;
   (d) a metal base on which said shielding case is mounted;
   (e) at least one conductor having one end extending outside of said metal case for connection to an external electric terminal and another end connected to a terminal of said drive circuit in said shielding case, said one conductor being electrically connected through said through-capacitor means to said shielding case;
   (f) connecting means for electrically connecting said shielding case to said metal base in a selected area on said bottom wall of said shielding case between an edge of said bottom wall connected to said one side wall in which said capacitor means is fixed and an edge of said circuit board closest to said one side wall.

2. A thermal air flow meter according to claim 1, wherein said connecting means includes a metal member extending through said shielding case and said metal base.

3. A thermal air flow meter according to claim 2, wherein said metal member is positioned between said circuit board and said one side wall of said shielding case.

4. A thermal air flow meter according to claim 1, wherein said capacitor is formed with a through-hole through which said conductor extends from outside to inside of said shielding case.

5. A thermal air flow meter according to claim 1, wherein said selected area at which said connecting means connects said shielding case to said metal base is substantially immediately beneath said capacitor means and is spaced from said drive circuit mounted on said circuit board.

6. A thermal air flow meter comprising:
   a thermal sensor disposed in an intake air passage through which an air to be measured flows;
   a printed driving circuit formed on a circuit board for driving said thermal sensor and having terminals to which electrical conductors are connected for electrical connection of said driving circuit to external electrical equipment;
   a shielding case made of an electrical conductive material and having a bottom wall to which said cirucit board is fixed and side walls connected to respective edges of said bottom walls;
   a flow meter case for mounting said shielding case therein and having a base made of an electrical conductive material to which the bottom wall of said shielding case is fixed;
   capacitor means including a plurality of capacitors fixed to one of the side walls of said shielding case and electrically connected to that the conductors connected to the terminals of said driving circuit are electrically connected through said capacitors, respectively, to said shielding case; and
   means for electrically connected said shielding case to the base of said flow meter case at a portion selected in an area on said base corresponding to an area on the bottom wall of the shielding case disposed between an edge of the bottom wall connected to the one side wall of the shielding case to which said capacitor means is fixed and an edge of the circuit board closest to said one side wall.

7. A thermal air flow meter according to claim 6, wherein said connecting means includes a metal member extending at said selected portion through said shielding case and said metal base.

8. A thermal air flow of meter according to claim 6, wherein each of said capacitors is formed with a through-hole through which a conductor extends from outside to inside of said one side wall of said shielding case.

9. A thermal air flow meter according to claim 6, wherein said selected area at which said connecting means connects said shielding case to said metal base is substantially immediately beneath said capacitor means and is spaced from said drive circuit mounted on said circuit board.

10. A thermal air flow meter according to claim 7, wherein said metal member is positioned between said circuit board and said one side wall of said shielding case.

* * * * *